(12) United States Patent
Hooda et al.

(10) Patent No.: US 10,397,141 B2
(45) Date of Patent: Aug. 27, 2019

(54) ACCESS PORT FOR ONE OR MORE VLANS

(71) Applicant: Cisco Technology, Inc., San Jose, CA (US)

(72) Inventors: Sanjay Kumar Hooda, Pleasanton, CA (US); Atri Indiresan, Sunnyvale, CA (US); Da-Yuan Tung, Cupertino, CA (US); Kaushik Kumar Dam, San Jose, CA (US); Anand Pulicat Gopalakrishnan, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/721,914

(22) Filed: Oct. 1, 2017

(65) Prior Publication Data

US 2019/0104091 A1 Apr. 4, 2019

(51) Int. Cl.
*H04L 12/931* (2013.01)
*H04L 12/24* (2006.01)
*H04L 12/46* (2006.01)
*H04L 29/06* (2006.01)

(52) U.S. Cl.
CPC ........ *H04L 49/354* (2013.01); *H04L 12/4675* (2013.01); *H04L 41/0896* (2013.01); *H04L 63/10* (2013.01)

(58) Field of Classification Search
CPC ............... H04L 49/354; H04L 41/0896; H04L 12/4675; H04L 63/10
See application file for complete search history.

(56) References Cited

U.S. PATENT DOCUMENTS

| | | | |
|---|---|---|---|
| 9,641,462 B2 | 5/2017 | Janakiraman et al. | |
| 2003/0217148 A1 | 11/2003 | Mullen et al. | |
| 2005/0193427 A1 | 9/2005 | John | |
| 2010/0040068 A1* | 2/2010 | Wimmer | H04L 41/08 370/395.53 |
| 2010/0046525 A1* | 2/2010 | Gilmartin | H04L 12/4641 370/395.53 |
| 2010/0322253 A1 | 12/2010 | Zhang et al. | |

(Continued)

OTHER PUBLICATIONS

Dynamic VLAN Assignment with RADIUS Server and Wireless LAN Controller Configuration Example; available at: https://www.cisco.com/c/en/us/support/docs/wireless-mobility/wireless-vlan/71683-dynamicvlan-config.html; Sep. 24, 2012.

(Continued)

*Primary Examiner* — Brian D Nguyen

(57) ABSTRACT

In one embodiment a network device includes a plurality of ports. The network device is adapted to receive at least one configuring instruction, and adapted, after receipt of any of the at least one configuring instruction, to configure one or more access ports, of the plurality of ports, for endpoint virtual local area network (VLAN) assignment that is in accordance with at least one VLAN assignment algorithm. The at least one VLAN assignment algorithm allows at least two endpoints to be assigned to at least two different respective VLANs of a plurality of VLANs in a network, the at least one VLAN assignment algorithm enabling the at least two endpoints to connect to a same access port of the one or more access ports and provide data which is not VLAN tagged when received at the same access port.

20 Claims, 4 Drawing Sheets

(56) References Cited

U.S. PATENT DOCUMENTS

| | | | |
|---|---|---|---|
| 2011/0261820 A1* | 10/2011 | Alexander, Jr. | H04L 12/4645 370/392 |
| 2012/0084406 A1 | 4/2012 | Kumbalimutt | |
| 2012/0106546 A1* | 5/2012 | Sinha | H04L 12/4666 370/389 |
| 2012/0250693 A1* | 10/2012 | Gilmartin | H04L 12/4641 370/395.53 |
| 2013/0117421 A1* | 5/2013 | Wimmer | H04L 12/4645 709/220 |
| 2014/0177477 A1* | 6/2014 | Cachin | H04L 45/128 370/256 |
| 2016/0248601 A1* | 8/2016 | Nomi | H04L 12/4641 |
| 2017/0366396 A9* | 12/2017 | Nilakantan | H04L 67/34 |

OTHER PUBLICATIONS

Dynamic VLAN Assignment on Autonomous Access Point for Release 15.2(2) JB Configuration Example, available at: https://www.cisco.com/c/en/us/support/docs/wireless-mobility/wireless-lan-wlan/116581-configure-dynamicvlan-00.html; Oct. 14, 2013.

* cited by examiner

ACCESS PORT FOR ONE OR MORE VLANS

TECHNICAL FIELD

The present disclosure generally relates to access ports.

BACKGROUND

A virtual local area network (VLAN) is a data link layer (layer 2) forwarding domain that is isolated from other VLANs in an Internet Protocol (IP) network. A subnet provides a set of contiguous Internet Protocol (IP) addresses in the VLAN.

A trunk port is a port on a network device which is configured for trunk mode. In trunk mode, data that is associated with different VLANs may be admitted by the port as long as the data is tagged to specify the associated VLANs (e.g. 802.1Q tagging, Inter-Switch Link tagging, etc.) and/or the data is associated with the native VLAN of the port. In contrast, an access port on a network device is a port that is configured for access mode. In access mode, data that is admitted to the port (i.e. not dropped by the port) does not need a tag that specifies the VLAN associated with the data.

BRIEF DESCRIPTION OF THE DRAWINGS

So that the present disclosure may be understood by those of ordinary skill in the art, a more detailed description may be had by reference to aspects of some illustrative implementations, some of which are shown in the accompanying drawings. The appended drawings, however, illustrate only some example features of the present disclosure and are therefore not to be considered limiting, for the description may admit to other effective features.

Figure 1:
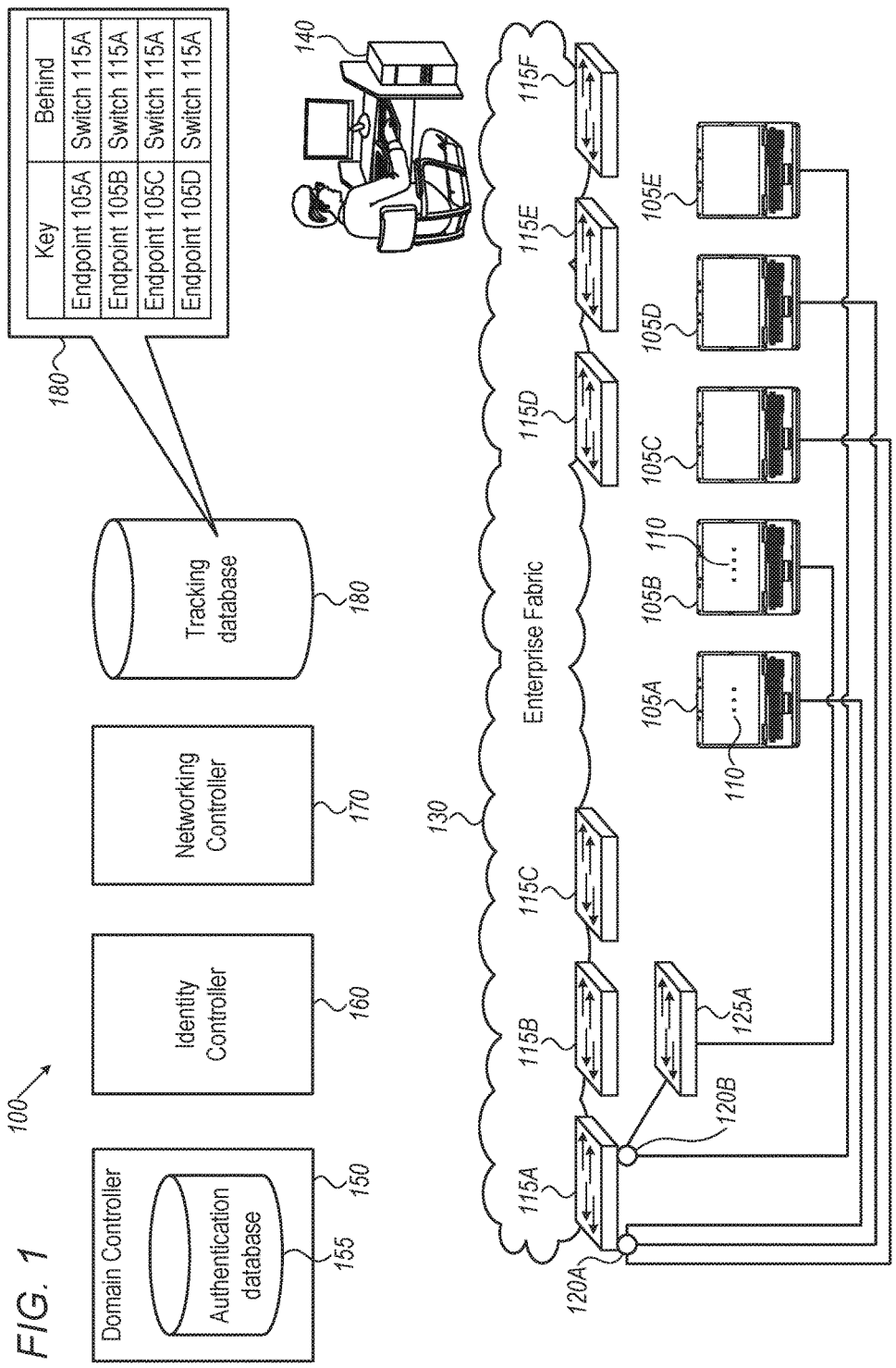
FIG. 1 is a block diagram of a network, in accordance with some embodiments of the presently disclosed subject matter.

In accordance with common practice the various features illustrated in the drawings may not be drawn to scale. Accordingly, the dimensions of the various features may be arbitrarily expanded or reduced for clarity. In addition, some of the drawings may not depict all of the elements, stages, etc. of a given network, method, etc.

DESCRIPTION OF EXAMPLE EMBODIMENTS

Overview

There is provided, in accordance with some embodiments of the presently disclosed subject matter, a network device comprising a plurality of ports, the network device adapted to receive at least one configuring instruction, and adapted, after receipt of any of the at least one configuring instruction, to configure one or more access ports, of the plurality of ports, for endpoint virtual local area network (VLAN) assignment that is in accordance with at least one VLAN assignment algorithm, wherein the at least one VLAN assignment algorithm allows at least two endpoints to be assigned to at least two different respective VLANs of a plurality of VLANs in a network, the at least one VLAN assignment algorithm enabling the at least two endpoints to connect to a same access port of the one or more access ports and provide data which is not VLAN tagged when received at the same access port.

There is further provided, in accordance with some embodiments of the presently disclosed subject matter, a network device adapted to admit, at one or more access ports included in the network device, data from endpoints that have been assigned to various virtual local area networks (VLANs) of a network and are connected to any of the one or more access ports, the data indicative of respective identifiers of the endpoints, the network device being further adapted to use the respective identifiers to determine the various VLANs to which the endpoints were assigned, and to forward the data at least partly based on the various VLANs that were determined.

There is further provided, in accordance with some embodiments of the presently disclosed subject matter, a method comprising applying at least one virtual local area network (VLAN) assignment algorithm to assign an endpoint, connected to an access port of a network device in a network, to a respective VLAN of a plurality of VLANs in the network, wherein subsequent to the applying, at least two endpoints, including the assigned endpoint, that are connected to the access port and provide data that is not VLAN tagged when received by the access port, are characterized by having been assigned to at least two different respective VLANs of the plurality of VLANs, and wherein the at least two different respective VLANs, include the respective VLAN.

There is further provided, in accordance with some embodiments of the presently disclosed subject matter, a system comprising means for dividing a network into a plurality of virtual local area networks (VLANs), and means for providing, to a plurality of network devices in the network, a plurality of configuring instructions for configuring a plurality of access ports of the plurality of network devices for endpoint VLAN assignment that is in accordance with at least one VLAN assignment algorithm, wherein the at least one VLAN assignment algorithm allows at least two endpoints to be assigned to at least two different respective VLANs of the plurality of VLANs, the at least one VLAN assignment algorithm enabling the at least two endpoints to connect to a same access port of the plurality of access ports and provide data which is not VLAN tagged when received at the same access port.

Detailed Description of Example Embodiments

Conventionally, because data admitted to an access port need not specify the VLAN, or in other words need not be VLAN-tagged, the access port is assigned to a single VLAN, for example, by a network administrator. In some cases all VLAN-tagged data may be dropped by the access port, whereas in other cases VLAN-tagged data for VLANs other than the assigned VLAN may be dropped by the access port. In either case, data admitted to the access port is restricted to data associated with the assigned VLAN. Therefore, an endpoint which is connected directly to the access port, or indirectly (e.g. via a subtended switch), is assigned to the same VLAN as the access port. The assignment of the endpoint to the VLAN may need to be performed prior to authentication, e.g. when the authentication method uses Microsoft® Active Directory®.

It may be difficult, however, to predict the respective quantity of endpoints that are to be connected to each access port in a network. Typically although not necessarily, the number of endpoints in a network is much larger than the number of access ports in the network. If the IP addresses (available to all endpoints that would be connected to access ports in the network) were to be divided among a plurality of subnets, the number of IP addresses available in each subnet would be lower than the number of IP addresses available as a whole. If endpoints connected to certain access ports are assigned IP addresses from a single subnet associated with the VLAN(s) assigned to those access ports, as is the conventional practice, there may be insufficient IP addresses for all of such endpoints, e.g. due to endpoints connected to a subset of the certain access ports exhausting all available IP addresses of the subnet. Additionally or alternatively, the assignment of access ports to VLANs may lead to a surplus of IP addresses in any particular associated subnet that are not needed. For example, if a certain quantity of IP addresses in a subnet are reserved per access port based on the maximum number of endpoints that might be connected to any access port, there may be inefficiencies; because the number of endpoints that will be connected to any access port may vary in practice. Therefore an intimate network knowledge may be needed, so that sufficient IP addresses may be available for endpoints connected to any of the access ports of the network, or a single subnet may be used in the network. Regardless of whether the single subnet is associated with the same single VLAN for all access ports in the network, or with different single VLANs for different network devices or groups of network devices, having only one VLAN is typically, although not necessarily, not advantageous (compared to having a plurality of VLANs). For example, having only one VLAN may be disadvantageous with respect to, e.g. broadcast, congestion, and/or security, etc. Continuing with describing potential disadvantages, having only one VLAN in a network may lead to network meltdowns in case of a loop.

In contrast, in some embodiments of the presently disclosed subject matter, an access port is not necessarily restricted to a single VLAN. The network device that includes the access port may be adapted to admit at the access port data associated with one or more VLANs, without requiring VLAN tagging. For example, various endpoints may be directly or indirectly (e.g. through subtended switch/es) connected to the access port. The various connected endpoints may be assigned to one or more VLANs dynamically, as will be explained in more detail below. The network device may be adapted to use respective identifiers of the endpoints such as MAC address, IP address, username, hostname, device manufacturer (also referred to as Organizationally Unique Identifier "OUI"), authentication parameter(s), and/or any other parameter(s), indicated in the data to determine to which of the various VLANs the endpoints were assigned. The network device may be adapted to then forward the data, at least partly based on the determination.

Endpoints in a network may be assigned to particular VLANs by way of any appropriate VLAN assignment algorithm(s). In some embodiments, the VLAN assignment algorithm(s) may include proportional assignment algorithm(s). A proportional assignment algorithm assigns endpoints to VLANs in a proportional manner. A proportional manner may be dependent, or in other words may take into account, the quantities of IP addresses, or the quantities of free IP addresses (meaning available IP addresses) in the subnets associated with the VLANs. For example, a first subnet may have twice as many IP addresses or free IP addresses as a second subnet, and therefore more endpoints may be assigned to the first VLAN associated with the first subnet than to the second VLAN associated with the second subnet. Additionally or alternatively, the VLAN assignment algorithm(s) may include other algorithm(s), such as assignment of an endpoint based on one or more identifiers (e.g. OUI) of the endpoint, etc. Because the assignment is of an endpoint to a particular VLAN rather than of an access port to a particular VLAN, the endpoint may remain assigned to a VLAN associated with the same subnet, even if the endpoint is disconnected from an access port and connected, during a reconnection to the network, to another access port in the network. The endpoint may be assigned to a VLAN associated with the same subnet regardless of whether or not the other access port is connected to other endpoint(s) assigned to other VLANs(s). The access port and the other access port may be included in the same network device or different network devices. Once the endpoint is connected to the other access port, the network device that includes the other access port may forward the data from the endpoint at least partly in accordance with the VLAN assigned to the endpoint.

The term endpoint is used herein for a node that may be assigned an individual Internet Protocol (IP) address. Endpoint(s) may include, for example, physical network interface card(s) and/or virtual network interface card(s), e.g. where a virtual network interface card is associated with a particular virtual machine. The term host is used herein for a physical device that may be assigned one or more IP address(es), depending on the number of endpoint(s) represented by the host (e.g. depending on the number of network interface card(s) of the host). Examples of a host may include a router or a computer (e.g. server computer, laptop, smartphone, personal computer, etc.). The term connected is used herein for any suitable connection, whether direct or indirect, wired or wireless.

Referring now to the drawings, FIG. 1 is a block diagram of a network 100, in accordance with some embodiments of the presently disclosed subject matter. Elements shown in FIG. 1 for network 100 will now be described.

Network 100 includes a plurality of network devices 115 having a plurality of access ports 120 (also referred to as edge ports). For example, network devices 115A, 115B, 115C, 115D, 115E and 115F are shown in FIG. 1, and two access ports 120A and 120B are shown on network device 115A of FIG. 1, but the quantities of network devices 115 and access ports 120 may vary depending on the embodiment. Network devices 115 may include, for instance, layer 2 switch(es), layer 3 switch(es), and/or router(s), etc. Access ports 120, for instance, may be physical ports. Optionally, network 100 further includes one or more subtended switches 125 connected to access ports 120. One subtended switch 125A is shown in FIG. 1, connected to access port 120B.

Network devices 115 may include any appropriate software and/or hardware to implement the functionality ascribed herein to network devices 115. Hardware for a given network device 115 may include, for instance, any of the following: one or more physical ports, one or more physical layers (PHY(s)), forwarding logic, one or more central processing units (CPU(s)), memory used by the CPU(s) (e.g. memory for holding software that may be executed by the CPU(s)), etc. Forwarding logic may include, for instance, application-specific integrated circuit(s) (ASIC(s)) and/or field programmable gate array(s) (FPGA(s)), etc. Hardware of a forwarding ASIC may include, for instance, any of the following: packet buffer memory, forwarding controller(s), network interface(s), queue(s) memory, look up table(s) memory, etc. Specific examples of functionality of a given network device 115 may be respectively attributed herein to particular software and/or hardware of the given network device 115. However, the specific examples of functionality may instead or also be performed by other software and/or hardware of the given network device 115 than the respectively attributed software and/or hardware. Although certain hardware and/or software of a given network device 115 are described in the single form (and/or certain hardware and/or software of the given network device 115 are described in the plural form), a plurality of any of such hardware and/or software (and/or a single one of any of such hardware and/or software) may be included in the given network device 115. Examples of Cisco products which may be adapted to implement the functionality ascribed herein to network devices 115, may include Catalyst 9300, Catalyst 3850, Catalyst 3650, Catalyst 9400, and/or Catalyst 4000, etc.

Network 100 further includes a plurality of endpoints 105. Illustrated are endpoints 105A, 105B, 105C, 105D and 105E, but the number of endpoints 105 may vary depending on the embodiments. It is assumed that in network 100 there is a one to one correspondence between hosts and endpoints and thus each endpoint 105 is a host that may be assigned one IP address in network 100. In certain of endpoints 105, namely in endpoint 105A and 105B, the endpoint (which in FIG. 1 is a host) includes a plurality of virtual machines 110, and the virtual machines 110 included in the host may share the IP address assigned to the host.

Endpoints 105 may be directly or indirectly connected to access ports 120. For example, endpoints 105A, 105C, 105D are shown directly connected to access port 120A on access network device 115A. Endpoint 105B is shown indirectly connected to access port 120B on access network device 115A, via subtended switch 125A, and endpoint 105E is shown directly connected to access port 120B.

In FIG. 1, network devices 115 are shown as part of a fabric 130 which interconnects endpoints 105. Fabric 130 may, for example, be an enterprise fabric or any other type of fabric. Cisco® software defined access (SD_Access) is an example of an enterprise fabric. Alternatively, network devices 115 may not necessarily be part of a fabric, as long as network 100 is any suitable network. An example of a suitable network may be a network that has a unified (or in other words a uniform) subnet assignment policy for endpoints 105 across the plurality of network devices 115 in the network. A uniform subnet assignment policy may mean that for any particular endpoint 105, say endpoint 105A, endpoint 105A would be assigned to a VLAN that is associated with a particular subnet, regardless of whether endpoint 105A is connected to an access port 120 of network device 115A, or connected to an access port 120 of another network device 115 (say network device 115B). Another example of a suitable network may be a network that includes a plurality of network devices, a plurality of access ports, and zero or more connected endpoints per access port, without necessarily having a uniform subnet assignment policy.

Network 100 further includes a domain controller 150, an identity controller 160, a networking controller 170, and a tracking database 180. Domain controller 150, identity controller 160, networking controller 170 and tracking database 180 are adapted to provide services to network devices 115 and to the endpoints 105. Domain controller 150, identity controller 160, networking controller 170 and tracking database 180 may be IP reachable from one another, from network devices 115 and/or from other elements shown in network 100. For examples, any of network devices 115 may communicate using IP protocol(s) with domain controller 150, identity controller 160, networking controller 170 or tracking database 180 by way of the IP address of domain controller 150, identity controller 160, networking controller 170 or tracking database 180, respectively.

Domain controller 150 is adapted to provide authentication services to endpoints 105, and/or to users associated with endpoints 105. Domain controller 150 may include an authentication database 155 which holds authentication information. An example of domain controller 150 is Microsoft Active Directory which performs dynamic authentication.

Identity controller 160 is adapted to provide identity services and/or policy services, with respect to endpoints 105 and/or users associated with endpoints 105. An example of identity controller 160 is Cisco Identity Services Engine, adapted to use EasyConnect.

Networking controller 170 is adapted to track and manage resources of network 100. Networking controller 170 may, for instance, be a software defined networking controller. An example of networking controller 170 is Cisco Application Policy Infrastructure Controller Enterprise Module.

Tracking database 180 is adapted to hold data relating to the operation of network 100 such as any of the following: indications of assignment of endpoints 105 to VLANs, indications of associations of subnets and VLANs, quantities of IP addresses (e.g. per subnet, available per subnet, and/or used per subnet), indications of assignments of IP addresses to endpoints 105, indications of assigned IP addresses, indications of available IP addresses, endpoint/access port connections (e.g. which access port 120 a particular endpoint 105 is connected to), endpoint/network device associations (e.g. which network device 115 a particular endpoint 105 is behind), etc.

In various embodiments, any of domain controller 150, identity controller 160, networking controller 170, or tracking database 180 may each include any appropriate software and/or hardware to implement the functionality ascribed herein to the element in network 100.

Any of domain controller 150, identity controller 160 and/or networking controller 170 may, for instance, comprise a dedicated server computer or plurality of dedicated server computer(s) that include(s) processor(s), specially constructed to respectively provide authentication services, identity/policy services and/or resource track/manage services. Optionally such server computer(s) also perform other functions (e.g. relating to network 100). Such dedicated server computer(s) are also referred to as server appliance(s). Additionally or alternatively, any of domain controller 150, identity controller 160 and/or networking controller 170 may comprise a general purpose server computer or plurality of general purpose server computer(s) that include processor(s), specially configured by software to respectively provide authentication services, identity/policy services and/or resource track/manage services. Optionally, the general purpose server computer(s) also perform other function(s) (e.g. relating to network 100). Additionally or alternatively, any of domain controller 150, identity controller 160 and/or networking controller 170 may comprise virtual machine(s) in general purpose server computer(s) having processor(s), the virtual machine(s) specially configured by software to respectively provide authentication services, identity/policy services and/or resource track/manage services. In embodiments where any of domain controller 150, identity controller 160 and/or networking controller 170 include a plurality of server computers (such as a cluster of server computers), the plurality of server computers may be located in the same location or distributed over a plurality of locations. Any suitable memory may be a means for holding data relating to network operation, e.g. by being a means for implementing tracking database 180 and/or authentication database 155. Memory, for instance, may be included in any of the server computer(s); may not be included in, but may be located at the same location as any of the server computer(s); and/or may be remote from any of the server computer(s). Memory that implements tracking database 180 and/or authentication database 155 optionally also holds software.

Domain controller 150, identity controller 160, networking controller 170, and tracking database 180 may be located at the same location (e.g. optionally sharing the same server computer(s), processor(s) and/or memory), or may not all be located at the same location. Any of domain controller 150, identity controller 160, networking controller 170, or tracking database 180 may be located on the same premises as network devices 115 and/or any may be located remote from network devices 115 (e.g. may be located in a cloud). For example, the platform as a service model may be applicable if in the cloud.

Network 100 further includes a network administrator device 140. Network administrator device 140 is adapted to receive input from a network administrator and provide output to a network administrator regarding network 100 (or in other words includes a means for receiving input from the network administrator and a means for providing output to the network administrator). For example network administrator device 140 may include one or more user devices that include at least one processor. Examples of a user device may include a smartphone, a laptop, a personal computer, etc. Additionally or alternatively, network administrator device 140 may include input and/or output device(s) (e.g. terminal(s), etc.). The input that is inputted by the network administrator into network administrator device 140 may, for example, be received by network device(s) 115 and/or by networking controller 170 from network administrator device 140. The output that is outputted by network device 140 to the network administrator, may for example, have been provided by network device(s) 115 and/or by networking controller 170 to network administrator device 140. The network administrator, for instance, may be responsible for administering the setup and operation of network devices 115. Network administrator device 140 may, for instance, be plugged into a console port of any network device 115, and/or may communicate with element(s) in network 100 via any other suitable connection(s).

Network 100 may include fewer, more and/or different elements than shown in FIG. 1, in some embodiments. For example, in some embodiments, subtended switches 125 may be omitted. As another example, any of domain controller 150, authentication database 155, and/or identity controller 160 may additionally or alternatively be omitted if the services are not required. As another example, additionally or alternatively, tracking database 180 may be omitted if data relevant to the subject matter is held elsewhere (e.g. in network devices 115). As another example, additionally or alternatively, either network administrator device 140 or networking controller 170 may be omitted. As another example, additionally or alternatively, two or more elements shown in FIG. 1 may be consolidated into fewer elements performing the functionality attributed to the two or more elements herein. As another example, additionally or alternatively, one or more elements shown in FIG. 1 may be divided into a larger number of elements. As another example, additionally or alternatively, functionality attributed herein to a particular element shown in FIG. 1 may instead or also be performed by one or more other element(s) of FIG. 1. As another example, additionally or alternatively, although certain of the elements are described with reference to FIG. 1 in the single form (and/or certain elements are described with reference to FIG. 1 in the plural form), a plurality of any of such element(s) (and/or a single one of any of such elements) may be included in network 100. In any of the above examples, or similar examples, the software and/or hardware of the elements in network 100 may be adjusted accordingly, if necessary.

A system in accordance with the present disclosure may include one or more of the elements described with reference to FIG. 1. For example, in various embodiments the system may include any of the following: one or more network devices such as network device(s) 115; one or more access ports such as access port(s) 120, one or more processor(s) for providing service(s); memory for holding data relating to network operation and/or for holding software; one or more endpoints such as endpoint(s) 105, one or more subtended switch(es) such as subtended switch(es) 125; one or more network administrator device(s) such as network device 140, any appropriate means; etc.

Figure 2:
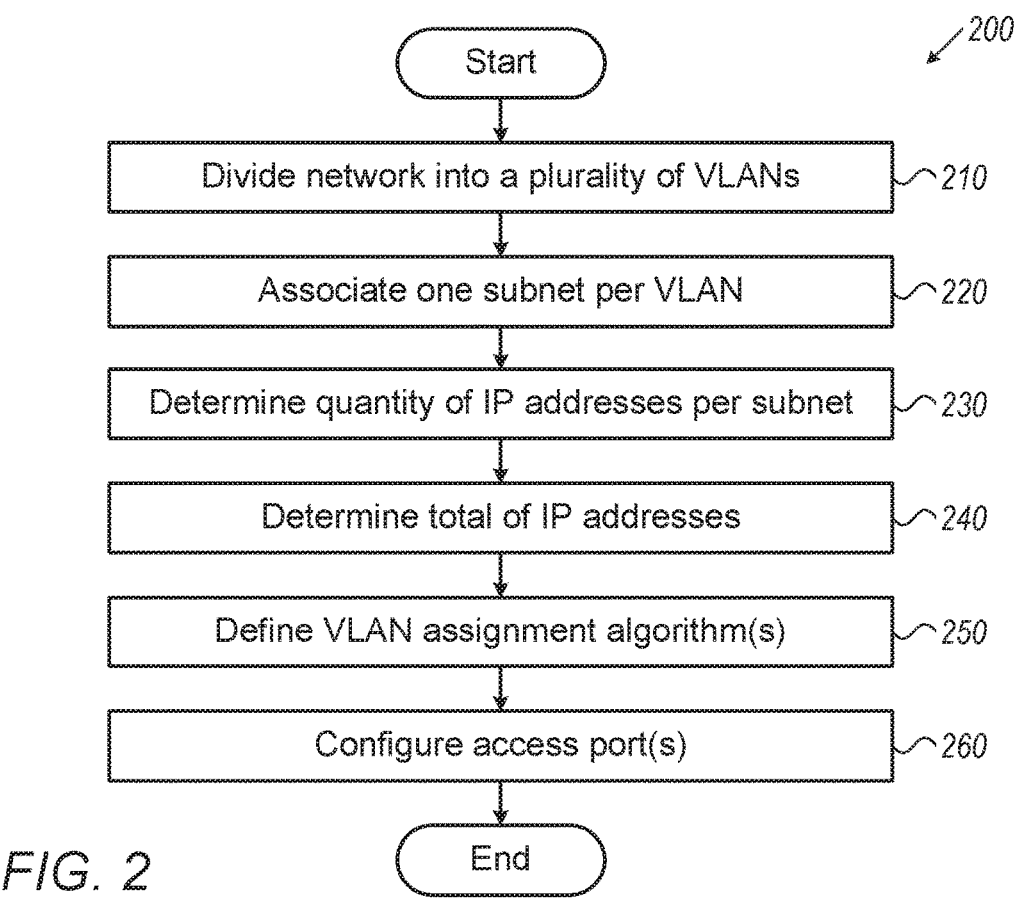
FIG. 2 is a flowchart of a method, in accordance with some embodiments of the presently disclosed subject matter.

FIG. 2 is a flowchart of a method 200, in accordance with some embodiments of the presently disclosed subject matter.

Method 200 will be described with reference to network 100, but may be applied to any suitable network.

In stage 210, network 100 is divided into a plurality of VLANs, e.g. by any appropriate means for dividing network 100, such as networking controller 170 and/or network administrator device 140.

Stage 210 may be performed, for example, when network 100 is first being set up. Continuing with describing such an example, stage 210 may be performed before any network devices 115 are connected in fabric 130, or when at least one network device 115 is being connected in fabric 130. As another example, stage 210 may be performed when a network administrator decides that an existing network 100 should be divided into VLANs. As another example, stage 210 may be additionally or alternatively performed when necessary for any particular network device(s) 115, when the network device(s) 115 is being connected to fabric 130.

The VLANs into which network 100 is divided may be identified in some embodiments by identifiers. One or more identifiers may identify any particular VLAN. For example, networking controller 130 or network administrator device 140 may arbitrarily associate an identifier with any particular VLAN (e.g. VLAN 1, VLAN 2, VLAN 3, etc.; or VLAN A, VLAN B, VLAN C, etc.). Additionally or alternatively, network administrator device 140 or networking controller 130 may associate an identifier with any particular VLAN based on input from the network administrator. Additionally or alternatively, network administrator device 140 or networking controller 170 may associate an identifier with any particular VLAN based on one or more characteristics of the VLAN (e.g. identifier for high security zone VLAN is "high security" or "VLAN 1", identifier for medium security zone VLAN is "medium security" or "VLAN 2", etc.). Additionally or alternatively, network administrator device 140 or networking controller 170 may associate any particular VLAN with an identifier inputted by the network administrator for association with the VLAN.

Stage 210 may be performed, for example, with reference to all network devices 115, e.g. when all network devices 115 will have the same VLANs associated with the same subnets (see stage 220 below). As another example, stage 210 may be performed independently with reference to each network device 115 or group of network devices 115, e.g. group of network devices in a respective domain. In the latter example, different VLANs for different network devices 115, or for different groups of network devices 115, may be associated with the same subnet. In either example, the performance may include one or more iterations of stage 210, performed concurrently or at separate times.

In stage 220, a subnet is associated with each VLAN, e.g. by any appropriate means for associating subnets with VLANs, such as networking controller 170 and/or network administrator device 140.

For example, a network administrator may specify subnets for VLANs of network 100. In some cases of such an example, the network administrator may specify the subnets by inputting into network administrator device 140 the data shown in the latter four columns of Table 1 that relates to the subnets, say subnet 1, 2 and 3 with /25, /24 and /23 as the masks. Such data may include the subnets, gateways, endpoint IP addresses ranges, and number of endpoint IP addresses.

TABLE 1

| Subnet# | Subnet | Gateway | Endpoint IPs range | # Endpoint IPs |
|---|---|---|---|---|
| 1 | 10.1.1.0/25 | 10.1.1.126 | 10.1.1.1-125 | X |
| 2 | 10.1.2.0/24 | 10.1.2.254 | 10.1.2.1-253 | 2X |
| 3 | 10.1.4.0/23 | 10.1.5.254 | 10.1.4.1-10.1.5.253 | 4X |

Additionally or alternatively, in some cases, the network administrator may input data shown in any of the second or third columns of Table 1 (e.g. the subnets and gateways). The gateway column in Table 1 may define the IP address to be given to the VLAN for inter-VLAN routing. Additionally or alternatively, in some cases, the network administrator may input the masks /25, /24 and /23. In this example, network administrator device 140 or networking controller 170 may in stage 220, after receipt of the input (e.g. where the input may be as per any of the cases described above), associate each one of the subnet(s) specified by the network administrator with a respective one of the VLANs into which network 100 was divided in stage 210. Network administrator device 140 or networking controller 170 optionally computes data from any of columns 2 to 4 in FIG. 1 that was not inputted, in order to associate subnets with VLANs. As another example, networking controller 170 may additionally or alternatively, in stage 220, associate the VLANs from stage 210 with default subnet(s), such as subnet(s) that are used when no input is received. In such an example, the subnets discussed with reference to Table 1 may represent default subnet(s).

In embodiments where the network administrator inputs data that will be used to associate subnets and VLANs, the network administrator may input data such as data shown in Table 1. For example, the network administrator may input such data before the first time that stage 220 is performed for network 100.

Network administrator device 140 or networking controller 170 optionally stores indication(s) of the subnet VLAN association(s), e.g. in relevant network device(s) 115 and/or in tracking database 180. For instance, an indication of association may include for a particular subnet associated with a particular VLAN, a mapping of identifier(s) of the VLAN to identifier(s) of the subnet. The mask(s) and/or any of the data in columns 1 to 3 may be used, for instance, as identifier(s) of the respective subnets.

Stage 220 may be performed for example, after each time stage 210 is performed, or after certain iterations of stage 210.

Stage 220 may be performed, for example, with reference to all network devices 115, e.g. if associating the same subnets with the same VLANs, for all network devices 115. As another example, stage 220 may be performed independently with reference to each network device 115 or group of network devices 115, (e.g. group of network devices 115 in a respective domain), that will have a certain subnet associated with a certain VLAN.

In stage 230, the respective quantities of IP addresses (including any free and any used) for the subnets are determined, e.g. by any appropriate means for determining the quantities such as networking controller 170 and/or network administrator device 140.

For example, the quantity for a particular subnet (e.g. as shown in column 5 of Table 1) may be inputted by a network administrator (e.g. into network administrator device 140). In this example, networking controller 170 or network administrator device 140 may determine the quantity by way of receiving what the network administrator inputted. Additionally or alternatively, networking controller 170 or network administrator device 140 may determine the quantity of IP addresses for a particular subnet based on the characteristic(s) of the particular subnet (e.g. based on the masks and/or any of columns 2 to 4 of Table 1, etc.).

In some other embodiments, the respective quantities of free IP addresses for the subnets may in stage 230 be additionally or alternatively determined e.g. by any appropriate means for determining such quantities such as networking controller 170 and/or network administrator device 140.

Figure 3:
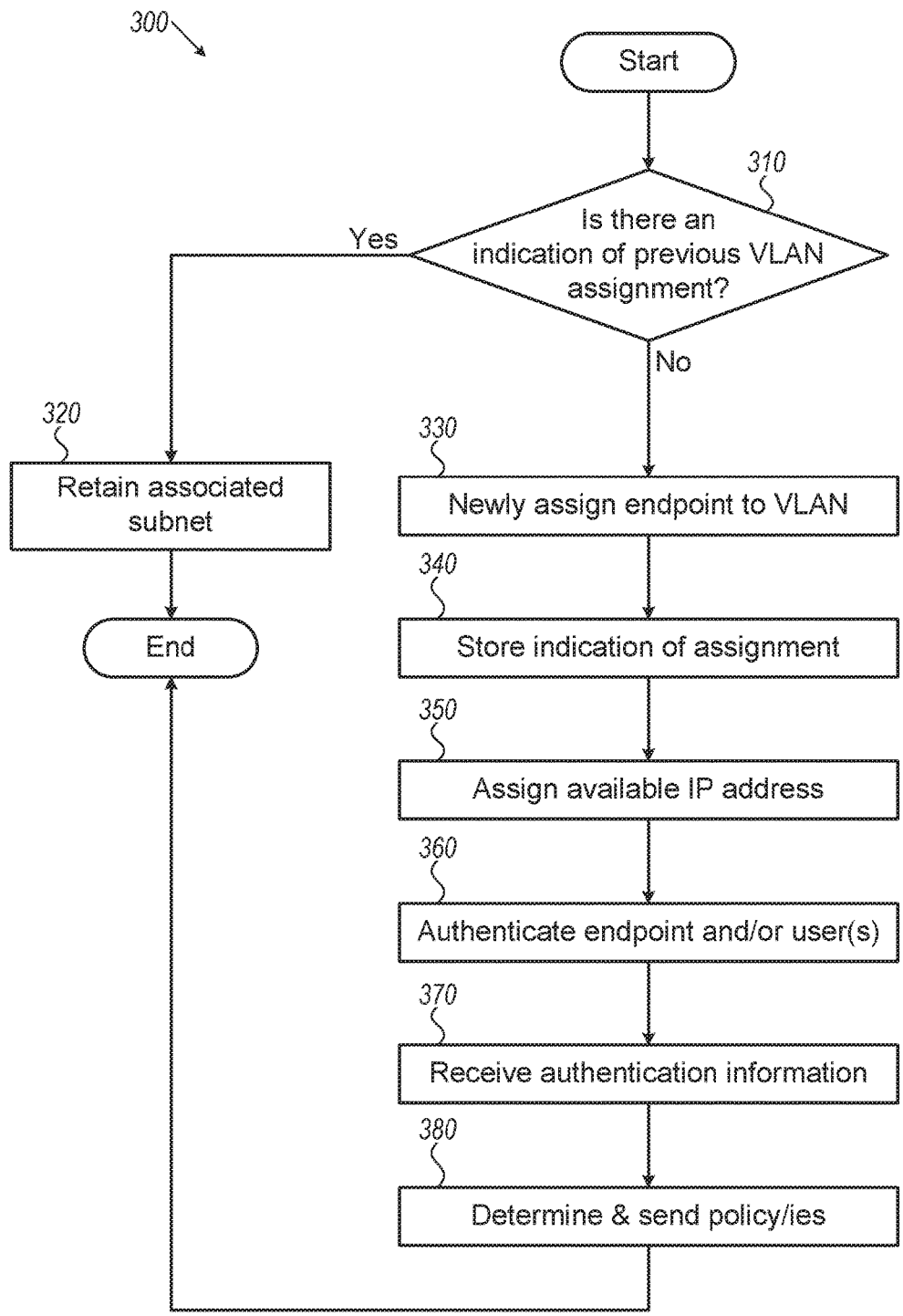
FIG. 3 is another flowchart of a method, in accordance with some embodiments of the presently disclosed subject matter.

For example, the quantity of free IP addresses for a particular subnet may be determined by subtracting the quantity of assigned (or in other words used) IP addresses for the particular subnet from the quantity of IP addresses for the particular subnet. Such a determination is optionally repeated a plurality of times for the particular subnet, e.g. after each assignment of an IP address from the particular subnet in stage 350 (FIG. 3).

In some other embodiments, stage 230 may be omitted, for instance because the VLAN assignment algorithm(s) that will be used to assign VLANs exclude proportional assignment algorithm(s).

In stage 240, the total of IP addresses for all of the subnets is determined, e.g. by any appropriate means for determining the total such as networking controller 170 and/or network administrator device 140. The total is the sum of the respective quantities determined in stage 230.

For example, the network administrator may input the total into network administrator device 140. Networking controller 170 or network administrator device 140 may determine the total by receiving the total inputted by the network administrator. Additionally or alternatively, networking controller 170 or network administrator device 140 may determine the total by calculating the sum of all of the quantities of IP addresses in the subnets.

Referring to subnets 1, 2, and 3 shown in Table 1, the total would be 7X, as shown in the last row and last column. A variable such as "X" may be used, for the quantities and/or total; or the actual number represented by the variable may be used, as either way the respective quantities of IP addresses for the various subnets are comparable.

In some other embodiments, stage 240 may be omitted. The total may not be determined, e.g. if the proportional assignment algorithm(s) does not require a total, or e.g., if the VLAN assignment algorithm(s) that will be used exclude proportional assignment algorithm(s).

If stages 230 and/or 240 are performed, stages 230 and/or 240 may be performed, for example, after the network administrator inputs data regarding the subnets, or after default subnets are established.

FIG. 2 shows stage 230 following stage 220, and stage 240 following stage 230. However in other embodiments where stages 230 and 240 are performed, stages 230 and 240 may be performed in any order or concurrently; for example, before stage 210, or at any time after stage 210 and before stage 250, if stage 250 requires the results of stage 230 and/or 240.

In stage 250, one or more VLAN assignment algorithm(s) are defined, e.g. by any appropriate means for defining the VLAN assignment algorithm(s), such as networking controller 170 and/or network administrator device 140.

The definition may be completely dependent on input from a network administrator, may be partially dependent on input from a network administrator, or may be automatically generated, e.g. based on any of stages 210, 220, 230 or 240. Certain VLAN assignment algorithm(s) may be defined for configuration of all network devices 115 in network 100, and/or different VLAN assignment algorithm(s) may be defined for configuration of different network devices 115, different access ports 120 on the same and/or on different network devices 115, etc. The VLAN assignment algorithm(s) may be considered to be dynamic because VLAN assignment for endpoints connected to a single access port are not necessarily restricted to a single VLAN as would be the case if the access port were necessarily restricted to a single VLAN (or in other words because the VLAN assignment algorithm(s) allow two or more endpoints connected to a single access port to be assigned to at least two different respective VLANs).

For example, the one or more VLAN assignment algorithms that are defined may include one or more proportional assignment algorithms that are dependent on the respective quantities of IP addresses or free IP addresses (e.g. from stage 230). Referring to one proportional assignment algorithm that may be defined, the proportional assignment algorithm may be dependent, for instance, on the respective quantities because the proportional assignment algorithm may take into account the proportions of the respective quantities of IP addresses or free IP addresses with respect to the total. Continuing with describing such an instance, if the proportions are simply ratios of the respective quantities of IP addresses (from stage 230) to the total (e.g. from stage 240), then for subnets 1, 2, and 3 discussed with reference to Table 1, the proportions may be 1/7, 2/7 and 4/7 respectively. In another instance, the proportional assignment algorithm may be dependent on the respective quantities of IP addresses or free IP addresses because the proportional assignment algorithm may take into account the proportions of the respective quantities with respect to one another. Continuing with describing such an example, if the proportions are simply the respective quantities of IP addresses divided by the highest common denominator, the proportions may be 1, 2 and 4 respectively for subnets 1, 2, and 3 discussed above with reference to Table 1. In another instance, the proportional assignment algorithm may be dependent on the respective quantities of IP addresses or free IP addresses because the proportional assignment algorithm may take into account the respective quantities. Continuing with describing such an example for the respective quantities of IP addresses, the proportions may take into account 1X, 2X, 4X respectively for subnets 1, 2, and 3 discussed above with reference to Table 1.

A proportional assignment algorithm may include, for instance, a weighted function assignment such as weighted random function assignment, where the weights may be the proportions.

In another instance, additionally or alternatively, a proportional assignment algorithm may include a weighted round robin assignment, where the weights may be the proportions.

In another instance, additionally or alternatively, a proportional assignment algorithm may include assigning endpoints to a first VLAN until the quantity of endpoints 105 assigned to the first VLAN is equal to the quantity of IP addresses in an associated first subnet. Once the quantity endpoints equals the quantity of IP addresses in the first subnet, then endpoints 105 are assigned to a second VLAN until the quantity of endpoints 105 assigned to the second VLAN is equal to the quantity of IP addresses in an associated second subnet, and so on. In such an instance, the order of VLANs to which endpoints are assigned may be selected randomly or in accordance with the priority of the VLANs. For example, a VLAN for a high security zone may be prioritized over a VLAN for a medium security zone.

In another instance, additionally or alternatively, a proportional assignment algorithm may include assigning an endpoint to a VLAN associated with the subnet having the most free IP addresses, or having the highest percentage of free IP addresses to IP addresses.

The VLAN assignment algorithm(s) that are defined may, for example, additionally or alternatively include other (not necessarily proportional) algorithm(s), such as algorithm(s) where the assignment of an endpoint is based on one or more identifiers of the endpoint, and/or on a subnet associated with a previous VLAN assignment for the endpoint, etc. For instance, if the assignment is based on the OUI, then endpoints 105 sharing an OUI may be assigned to the same VLAN.

Typically although not necessarily, a proportional assignment algorithm includes an inherent condition, due to the proportionality, that a subnet associated with a to be assigned VLAN includes at least one available IP address. Other non-proportional algorithm(s), such as an algorithm that is dependent on identifier(s), may explicitly include such a condition, for instance if there is a possibility of the VLAN still being assigned after available IP addresses in the associated subnet have been exhausted.

In some embodiments, stage 250 may not necessarily be performed during method 200 for any or for all of the VLAN assignment algorithm(s). For example, default VLAN assignment algorithm(s) may have been defined, e.g. by a manufacturer during manufacturing and/or by way of a software update.

Regardless of the details of the VLAN assignment algorithm(s), the VLAN assignment algorithm(s) may include the feature of allowing at least two endpoints 105 to be assigned to at least two different respective VLANs, enabling the at least two endpoints 105 to connect to the same access port 120 and provide data which is not VLAN tagged when received at the same access port 120. Such a feature may be included for default VLAN assignment algorithm(s) and/or for VLAN assignment algorithm(s) defined in stage 250.

In embodiments where network 100 has a uniform subnet assignment policy, then regardless of the details of the VLAN assignment algorithm(s), all of the VLAN assignment algorithms (or at least one of the VLAN assignment algorithm(s)) may include the following feature: Any endpoint 105 whether it be connected to say, network device 115A or network device 115B, would be assigned to the VLAN that is, for the connected network device 115A or 115B, associated with a particular subnet. The VLAN that is associated with the particular subnet may be the same, or may be different for network device 115A and network device 115B.

Stage 250 may be performed for any particular VLAN assignment algorithm that is being defined, for example, before the first time the particular VLAN assignment algorithm is required in an iteration of stage 260 for network 100, or as part of the first iteration requiring the VLAN assignment algorithm. Additionally or alternatively, stage 250 may be repeated for any particular VLAN assignment algorithm that is being defined before each iteration of stage 260 that requires the particular VLAN assignment algorithm, or as part of the iteration.

In stage 260, one or more access ports 120 are configured. Each of the access ports 120 that is being configured is configured for endpoint VLAN assignment in accordance with VLAN assignment algorithm(s), thereby configuring the access port 120 to allow a plurality of VLANs on the access port 120. Configuring stage 260 may therefore include providing configuring instruction(s) to network device(s) 115, e.g. by any appropriate means for providing configuring instruction(s) to network device(s) 115, such as networking controller 170 and/or network administrator device 140. Stage 260 may further include network device(s) 115 receiving such configuring instruction(s). More specifically for example, respective CPU(s) in the receiving network device(s) 115 may receive the configuring instruction(s) (e.g. via Ethernet and/or console port(s)). Programming models such as Netconf/Yang may be used to transfer the configuring instruction(s) to such network device(s) 115.

Stage 260 may further include, after receiving any of the configuring instruction(s), network device(s) 115 configuring one or more access ports 120 for endpoint VLAN assignment in accordance with the VLAN assignment algorithm(s). The configuring may include configuring access port(s) 120 for endpoint VLAN assignment performed by network device(s) 115 and/or for endpoint VLAN assignment performed centrally. Configuration in accordance with the VLAN assignment algorithm(s) may include configuration in accordance with a subset of the VLAN assignment algorithm(s), if not all of the VLAN assignment algorithm(s) are necessarily applicable to every access port 120 that is to be configured. More specifically for example, respective CPU(s) in network device(s) 115 which received the configuring instruction(s) may configure such access port(s) 120.

Stage 260 may be performed, for instance, for any access port 120 that is or may be connected to endpoints assigned to different VLANs (see below stage 330—FIG. 3), e.g. at any time prior to the access port 120 receiving data from any of the connected endpoints. Stage 260 may additionally be performed for an access port that will be connected only to endpoints assigned to the same VLAN, e.g. so that all access ports in network 100 may be configured in a similar manner.

Stage 260 may be performed, in some cases, with respect to all access port(s) 120 to be configured to allow a plurality of VLANs per access port. In some cases, stage 260 may be performed independently with respect to each group of access ports that are to be so configured (e.g. a group of access port(s) may include all access port(s) 120 on a single network device 115, or may include all access port(s) in a single domain regardless of whether or not on a single network device 115). Stage 260 in some cases may be performed independently with respect to each access port to be so configured. In any of such cases, the performance may include one or more iterations of stage 260, performed concurrently or at separate times. Concurrent configuration of a plurality of access ports (e.g. of a group of access ports or of all access ports 120) may be feasible because the same VLANs may be assigned to endpoints across the plurality of access ports 120.

If stage 260 is performed for a plurality of access ports 120 on a particular network device 115, then one or more configuring instructions may be received by the particular network device 115 regarding the plurality of access ports 120. For instance, the particular network device 115 may be adapted to receive a plurality of configuring instructions, not necessarily at the same time, and may be adapted after receiving any of the configuring instructions, to configure one or more access ports.

In some embodiments, the software of network device(s) 115 may have been formulated at the manufacturing stage, or updated after the manufacturing stage, in order for network device(s) 115 to be adapted to configure access port(s) 120 after receiving configuring instruction(s). In such embodiments, network device(s) 115 (e.g. more specifically respective CPU(s) in network device(s) 115) may be adapted, due to the software, to configure access port(s) 120 after receiving configuring instruction(s), rather than discarding and/or ignoring such configuring instruction(s). The software may be held, for instance, in memory (e.g. Flash, static random access memory (SRAM), dynamic random access memory (DRAM), synchronous DRAM (SDRAM), and/or embedded DRAM, etc.) that may be used by the respective CPU(s) of network device(s) 115.

In some embodiments, a configuring instruction provided to any particular network device 115 (e.g. by network administrator device 140) may be based on input from a network administrator. In other embodiments the configuring instruction provided to any particular network device 115 (e.g. by networking controller 170) may not be based on input from the network administrator. The network administrator may input (e.g. into network administrator device 140 in order to access a command line interface of any particular network device 115), the following lines, for instance:

int g1/1/1
    switchport
    switchport mode access
    switchport access vlan dynamic [algorithmic <algorithm>]<vlan-list>
    !

Such lines that are inputted into network administrator device 140 for a command line interface of a particular network device, allow network administrator device 140 to provide a configuring instruction to the particular network device 115. The network administrator may additionally or alternatively provide such input for one or more other network device(s) 115 in network 100. In another instance, such lines or similar may be additionally or alternatively inputted into network administrator device 140, in order to enable networking controller 170 to provide configuring instruction(s) to one or more network devices 115. In another instance, networking controller 170 may additionally or alternatively provide the above lines, or similar, in order to provide configuring instruction(s) to one or more network devices 115.

The "switchport mode access" line above indicates that the port(s) that are to be configured, are to be configured for access mode (or in other words as access port(s)). The line beginning with "switchport access vlan" indicates that endpoint VLAN assignment (see below stage 330 of FIG. 3), is to be performed in accordance with VLAN assignment algorithm(s) (e.g. default and/or as defined in stage 250). One or more VLANs of network 100 listed in vlan-list (e.g. one or more of the VLANs into which network 100 was divided in stage 210) may be assigned. Together the lines provide a configuring instruction to configure the access port(s) for endpoint VLAN assignment that is in accordance with VLAN assignment algorithm(s), as will now be discussed in more detail.

Square brackets are shown in the lines above around the words "algorithmic <algorithm>", in order to indicate that in some embodiments any of the applicable VLAN assignment algorithm(s) may not necessarily be specified or referred to in stage 260.

For instance, a VLAN assignment algorithm may not necessarily be specified or referred to in stage 260, if the VLAN assignment algorithm (to be applied by network device(s) 115) is a default algorithm. In such an instance, stage 250 may have been omitted for the VLAN assignment algorithm. A default algorithm, for instance, may be an algorithm that was formulated at the manufacturing stage or later, and included in the software of network device(s) 115 (e.g. at the manufacturing stage, or when the software was updated).

For example, the line of the configuring instruction beginning with "switchport access vlan" may be implemented as "switchport access vlan dynamic 200-300" if the VLAN assignment algorithm to be applied is a default algorithm, by way of which VLANs 200 and 300 may be assigned to endpoint(s) connected to the access port(s) subject to receipt of the configuring instruction.

As another example, additionally or alternatively, a default VLAN assignment algorithm may include assignment of an endpoint that is being reconnected in the network to a VLAN associated with a particular subnet, the particular subnet being associated with a VLAN to which the endpoint was previously assigned. The VLAN to which the endpoint is being assigned may or may not be the same as the VLAN to which the endpoint was previously assigned. A listing of VLAN(s) for the algorithm may be omitted. Listing the VLAN(s) that may be assigned may not be needed if VLAN assignment is restricted by retention of the particular subnet(s). The line beginning with "switchport access vlan", in such an example may be implemented as "switchport access vlan dynamic".

In another instance, additionally or alternatively, VLAN assignment algorithm(s) may not necessarily be specified or referred to in stage 260, if the VLAN assignment algorithm(s) are to be applied centrally, e.g. by networking controller 170. In such an instance, a listing of the VLANs may also be omitted. The line beginning with "switchport access vlan", in such an instance may be implemented as "switchport access vlan dynamic".

In some embodiments, additionally or alternatively, stage 250 discussed above may be part of stage 260, for at least one VLAN assignment algorithm. In such embodiments, a configuring instruction may specify a particular VLAN assignment algorithm(s) (e.g. specify how the VLAN assignment algorithm(s) has been defined) so that network device(s) 115 may apply the particular VLAN assignment algorithm(s). If the configuring instruction is based on input from the network administrator, the network administrator may have inputted how the particular VLAN assignment algorithm(s) is to be defined.

For example, the line beginning with "switchport access vlan" may be implemented as "switchport access vlan dynamic algorithmic OUI=specific_24_bit_number 100", if the VLAN assignment algorithm to be applied is based on the OUI identifier of the endpoint, and the VLAN to be assigned to an endpoint identified by the specific 24 bit number for the OUI is VLAN 100. In some cases, such a VLAN assignment algorithm may be applied as long as the subnet associated with the VLAN has available IP address(es).

As another example, the line beginning with "switchport access vlan" may be implemented as "switch access vlan dynamic weighted-round-robin 100-200", if the algorithm to be applied is a weighted round robin algorithm, and the VLANs to be assigned are VLANs 100 and 200.

In some embodiments, additionally or alternatively, stage 260 may follow stage 250 for at least one VLAN assignment algorithm. The configuring instruction may refer to particular VLAN assignment algorithm(s) that was previously defined.

For example, the line beginning with "switchport access vlan" may be implemented as "switch access vlan dynamic algorithmic consult_tracking_database", if the VLAN assignment algorithm to be applied and the VLANs to be assigned are stored in tracking database 180, and network device(s) 115 is to consult tracking database 180 for the algorithm and VLANs when making an endpoint VLAN assignment. Therefore a listing of VLAN(s) for the algorithm may be omitted.

As another example, the line beginning with "switchport access vlan" may be implemented as "switch access vlan dynamic algorithmic central_VLAN_assignment", if it is desirable to make reference to a VLAN assignment algorithm in the configuring instruction. In this example, the VLAN assignment algorithm is to be applied centrally by networking controller 170 and therefore more details regarding the algorithm and a VLAN listing are not required to be provided.

In some embodiments, additionally or alternatively, configuration of a port as an access port, may be inherently indicative of endpoint VLAN assignment in accordance with default VLAN assignment algorithm(s) by the particular network device receiving the configuring instruction, or of central endpoint VLAN assignment. In such embodiments, the line beginning with "switchport access vlan" may be omitted. For example, it is possible that for the particular network device receiving the configuring instruction, all access ports are to be configured for such endpoint VLAN assignment.

It should be evident that other examples of the lines discussed above are possible, and the actual configuring instruction(s) may vary depending on the embodiment.

In some embodiments where stage 260 includes configuration of various access ports 120 on a plurality of network devices 115, concurrently and/or at different times, the configuration of the various access ports 120 may be similar or may vary. For example, the configuration may be similar with regard to the VLAN assignment algorithm(s) and/or with regard to the VLAN(s) that may be assigned in cases where network 100 has a uniform subnet assignment policy for endpoints 105 across the plurality of network devices 115.

In some embodiments, stage 260 may not necessarily be performed for all access ports 120 in network 100. For example, certain access ports 120 may each be assigned to a single respective VLAN, in a manner known in the art.

Method 200 ends after stage 260.

FIG. 3 is a flowchart of a method 300, in accordance with some embodiments of the presently disclosed subject matter.

Method 300 will be described with reference to network 100 of FIG. 1 but may be applied to any suitable network. Method 300 will be described, more specifically, with reference to access port 120A of network device 115A and to endpoint 105A, but may be applied to any access port 120 of any network device 115 and to any endpoint 105.

In stage 310, assuming that the VLAN assignment algorithm(s) includes the retention of associated subnets when performing VLAN assignments, it is determined (e.g. by network device 115A having access port 120A to which endpoint 105A is being connected, or centrally by networking controller 170) whether or not there is an indication that endpoint 105A was previously assigned to any of the plurality of VLANs in network 100.

Stage 310 may be performed, for instance, for endpoint 105A once endpoint 105A is connected to access port 120A in network 100 (e.g. in fabric 130). The determination of whether or not there is an indication of a previous VLAN assignment for endpoint 105A may be based on one or more identifier(s) of endpoint 105A, such as the media access control (MAC) address of endpoint 105A, the IP address, username, hostname, OUI, authentication parameter(s), and/or any other parameter(s). For example, if the identifier(s) of endpoint 105A include an IP address, it may be an indication that endpoint 105A was previously assigned to a VLAN associated with the subnet to which the IP address belongs.

As another example, a search, e.g. by network device 115A or networking controller 170, in tracking database 180, in network device 115A and/or in any other network device(s) 115 may determine whether any of the searched element(s) hold an indication of assignment of the endpoint 105A to a VLAN. A stored indication of VLAN assignment may include, for instance, a mapping of endpoint identifier(s) to VLAN identifier(s); a mapping of endpoint identifier(s) to identifier(s) of the associated subnet; a mapping of endpoint identifier(s) to identifier(s) of the VLAN or associated subnet in addition to a mapping of the identifier(s) of the VLAN to the identifier(s) of the subnet; etc. Such an indication of VLAN assignment, if any, may have been stored upon previous assignment of endpoint 105A to a VLAN when endpoint 105A was previously connected to any access port 120 in network 100. Depending on the embodiment, such an indication of VLAN assignment may remain indefinitely in tracking database 180 and/or in a particular network device 115 (e.g. network device 115A or a different network device 115) having the access port 120 to which endpoint 115A was previously connected; or may be deleted after a certain period of time has passed since disconnection of endpoint 105A from the previously connected access port 120. For example, the period of time may be set based on input from the network administrator.

If it is determined in stage 310 that there is an indication of endpoint 105A having been previously assigned to a VLAN, then stage 320 is performed, e.g. by network device 115A or by networking controller 170. More specifically for example, stage 320 may be performed by a CPU of network device 115A, optionally using additional resources such as forwarding tables (also referred to as look up tables in the forwarding logic). In stage 320 VLAN assignment algorithm(s) are applied to assign endpoint 105A to a VLAN, which in this case includes assigning endpoint 115A to a VLAN which is associated with the same subnet as associated with the VLAN to which the endpoint was previously assigned. The associated subnet is therefore retained, but the VLAN to which the endpoint is currently assigned may or may not be the same as the VLAN to which the endpoint was previously assigned, depending on the association of subnets to VLANs. Such a retained associated subnet is assumed to be in accordance with VLAN assignment algorithm(s), such as VLAN assignment algorithm(s) discussed above.

Network device 115A or networking controller 170 may retain the associated subnet by taking no action with regard to any indication of the VLAN assignment currently held in tracking database 180 and/or in network device 115A. For instance, currently held indication(s) may be relevant and sufficient, e.g. if needed to subsequently perform method 400 and/or to repeat stage 310. Additionally or alternatively, network device 115A or networking controller 170 may retain the associated subnet by taking no action, even though no indication of the VLAN assignment is currently held in tracking database 180 or in network device 115A (e.g. none currently held because endpoint 105A having an IP address is indicative of the VLAN assignment). Additionally or alternatively, network device 115A (e.g. more specifically a CPU of network device 115A), or networking controller 170 may retain the associated subnet by storing an indication of the VLAN assignment in tracking database 180 and/or in network device 115A. For instance, an indication of VLAN assignment that is not currently held in network device 115A (e.g. more specifically, not currently held in forwarding tables of network device 115A) may be stored in network device 115A (e.g. more specifically in the forwarding tables of network device 115A).

It is noted that the associated subnet may be retained in stage 320, regardless of whether endpoint 105A is connected to the same access port 120 as previously connected to, or is connected to a different access port 120 than previously connected to (whether in network device 115A or in a different network device 115). Method 300 then ends for endpoint 105A for which it was determined in stage 310 that there was an indication of a previous VLAN assignment.

As a result of stage 310, it may instead be determined that for endpoint 105A there is no indication of previous assignment of endpoint 105A to any of the plurality of VLANs. For example, an indication of assignment of endpoint 105A may not be found in any searched element in network 100 (e.g. tracking database 180, network device 115A and/or any other network device(s) 115), and the current identifier(s) of endpoint 105A may exclude an IP address.

In the case where there is no indication of a previous VLAN assignment or in the case that stages 310 and 320 are omitted, method 300 proceeds to stage 330. Stages 310 and 320 may be omitted, for example, if it is certain that endpoint 105A was not previously assigned to a VLAN. Continuing with describing such an example, at initial setup of network 100, when the initial endpoints 105 in network 100, including endpoint 105A, are being connected for the first time in network 100, stages 310 and 320 are optionally omitted. As another example, stages 310 and 320 may be omitted, if endpoint 105A would necessarily be assigned to a VLAN associated with a particular subnet based on the identifier(s) of endpoint 105A. Continuing with describing such an example, it is assumed that all endpoints 105 in network 100 having a specific OUI identifier are assigned to a VLAN that is associated with a particular subnet and endpoint 105A has the specific OUI identifier. Therefore, it would not be required to determine whether or not endpoint 105A was previously assigned to a VLAN, because the associated subnet would in any event be retained by following such an assignment. In such an example, the VLAN assignment algorithm(s) may not necessarily include a separate explicit algorithm regarding the retention of associated subnets. As another example, stages 310 and 320 may be omitted if VLAN assignment algorithm(s) exclude retention of associated subnets for any reason, such as undesirability of such a feature.

Stage 330 may be performed, e.g. by network device 115A or by networking controller 170. More specifically for example, stage 330 may be performed by a CPU of network device 115A, optionally using additional resources such as forwarding tables. In stage 330, VLAN assignment algorithm(s) are applied to assign endpoint 105A to a VLAN, which in this case includes assigning a newly assigned VLAN (or in other words assigning without regard to past assignment(s), if any, of endpoint 105A to any VLAN(s)). Such a new endpoint VLAN assignment is assumed to be in accordance with VLAN assignment algorithm(s), such as VLAN assignment algorithm(s) discussed above.

Stage 330 may be performed, for instance, for endpoint 105A after determining in stage 310 for endpoint 105A that there is no indication of a previous assignment of endpoint 105A to a VLAN. Additionally or alternatively, if stages 310 and 320 are omitted for endpoint 105A, stage 330 may be performed for endpoint 105A once endpoint 105A is connected to any access port 120 in network 100 (e.g. in fabric 130).

In some embodiments where networking controller 170 performs stage 320 or 330, networking controller 170 may provide the VLAN assignment for endpoint 105A to network device 115A. In some of such embodiments, networking controller 170 may not have access to an indication of association of subnets to VLANs for network device 115A. Networking controller 170 may in such cases apply the VLAN assignment algorithm(s) in stage 320 or 330. As a result of the application, networking controller 170 may provide the subnet that is associated with the assigned VLAN to network device 115A. Network device 115A may access an indication of association of subnets to VLANs in order to obtain the assigned VLAN from the provided subnet.

It is noted that subsequent to execution of stage 320 or 330 for endpoint 105A, it is possible that for access port 120A to which endpoint 105A is connected, all endpoint(s) 105 that are connected to access port 120A, and that provide data that is not VLAN tagged when received by access port 120A, are characterized by having been assigned to the same VLAN (or in other words have the same assigned VLAN). Alternatively, subsequent to execution of stage 320 or 330 for endpoint 105A, it is possible that for access port 120A to which the endpoint 105A is connected, at least two endpoints 105 (e.g. including endpoint 105A) that are connected to access port 120A, and that provide data that is not VLAN tagged when received by access port 120A, are characterized by having been assigned to at least two different respective VLANs (e.g. including the VLAN assigned for endpoint 105A). Optionally, connected endpoint(s) 105 may have also previously provided data that is not VLAN tagged (e.g. prior to execution of stage 320 or 330 for endpoint 105A). Endpoints 105A, 105C, and 105D connected to access port 120A, for example, may all have been assigned to a certain VLAN. As another example, endpoints 105A and 105C connected to access port 120A may both have been assigned to one particular VLAN and endpoint 105D connected to access port 120A may have been assigned to a different particular VLAN.

In stage 340, an indication of the new VLAN assignment from stage 330 is stored, for instance by network device 115A (e.g. more specifically by a CPU of network device 115A), or by networking controller 170. The stored indication of VLAN assignment may include, for example, a mapping of one or more identifiers of endpoint 105A, such as identifier(s) described above, to one or more identifiers of the VLAN; a mapping of one or more identifiers of endpoint 105A to one or more identifiers of the associated subnet; a mapping of one or more identifiers of endpoint 105A to one or more identifiers of the VLAN or associated subnet in addition to a mapping of one or more identifiers of the VLAN to one or more identifiers of the subnet; etc. An indication may be stored in tracking database 180. Additionally or alternatively, an indication may be stored in network device 115A (e.g. more specifically in the forwarding tables of network device 115A).

An indication of VLAN assignment for endpoint 105A that is held in tracking database 180 and/or in network device 115A, subsequent to stage 320 or 340, may be used for future reference, e.g. by network device 115A or networking controller 170 in a subsequent iteration of stage 310. Additionally or alternatively, an indication of VLAN assignment that is held in tracking database 180 and/or in network device 115A may be used for future operation by network device 115A, e.g. in method 400 of FIG. 4. In some embodiments, such an indication may not be held in tracking database 180 or in network device 115A.

In some embodiments, stage 340 may be omitted. For example, stage 340 may be omitted if an indication of VLAN assignment for endpoint 105A is not needed for future reference or for future operation. Continuing with describing such an example, if the IP address that is to be assigned to endpoint 105A (see stage 350 below) will be indicative of the assigned VLAN, an indication of the assignment need not be stored (or may be deleted after stage 350 is performed).

In stage 350, endpoint 105A is assigned an available IP address from the subnet associated with the VLAN assigned to endpoint 105A in stage 330. Endpoint 105A may also be assigned a default gateway for communicating with other VLANs by using the gateway as the exit point. For example, endpoint 105A may use a data host configuration protocol (DHCP) to receive an IP address. In such an example, an IP address may be assigned by any appropriate means for assigning an available IP address such as: by one of network devices 115 (e.g. 115C), e.g. in fabric 130, acting as a DHCP server; by networking controller 170 acting as a DHCP server; or by any other (e.g. external) DHCP server.

Indications of assigned IP addresses, of available IP addresses, and/or of assignments of IP addresses to endpoints 105 in network 100 may be held in tracking database 180. Additionally or alternatively, the quantity of IP addresses per subnet, the quantity of available IP addresses per subnet and/or the quantity of already assigned IP addresses per subnet may be indicated in tracking database 180. Consequently, an available IP address may be assigned in stage 350. Additionally or alternatively, a VLAN assignment in stage 330 may have relied on one or more quantities (e.g. quantity of IP addresses per subnet or quantity of available IP addresses per subnet), indicated in tracking database 180. For example, in stage 330 a VLAN associated with a subnet having at least one available IP address may have been assigned; and/or a VLAN may have been assigned using a proportional assignment algorithm that depends on respective quantities of IP addresses or of free IP addresses; etc., as discussed above.

The quantity of available IP addresses per subnet, quantity of assigned IP addresses per subnet, indications of assigned IP addresses, indications of available IP addresses and/or indications of assignments of IP addresses to endpoints 105 may be updated in tracking database 180 in stage 350 or subsequently, for the assignment of the IP address to endpoint 105A. For instance the update may be performed by the DHCP server or by networking controller 170 (e.g. regardless of whether or not networking controller 170 is acting as the DHCP server).

Stage 350 may be performed, for instance, for endpoint 105A after endpoint 105A is assigned a VLAN in stage 330. Stages 340 and 350 may be performed in any order, or concurrently.

In some embodiments, endpoint 105A may have only limited connectivity until after authentication. In such embodiments, stages 360, 370 and 380 may be performed for endpoint 105A.

In stage 360, endpoint 105A and/or the respective user(s) associated with the particular endpoint 105 are authenticated, e.g. by domain controller 150. For instance, domain controller 150 (e.g. Active Directory) may dynamically authenticate endpoint 105A and/or respective user(s). Stage 360 may be performed, for example, for endpoint 105A after endpoint 105A has been assigned an IP address in stage 350. Any parameter that relates to authentication stage 360 is referred to herein as an authentication parameter.

The authentication may include any suitable authentication procedure. For instance, a user associated with endpoint 105A may trigger the authentication procedure by inputting a username and password. Endpoint 105A may then communicate via network device 115A with domain controller 150. Authentication parameter(s) such as username, the group to which the user belongs (e.g. the security group), and IP address may be stored in authentication database 155. Authentication parameter(s) such as the IP address and MAC address may be stored in network device 115A.

In stage 370, authentication information (meaning one or more authentication parameters) regarding endpoint 105A and/or the respective user(s) is received from authentication database 155 and/or from network device 115, e.g. by a means for receiving the authentication information such as identity controller 160. The authentication information that is received may relate to the authentication performed in stage 360 for the endpoint 105A and/or the user(s). The authentication information received from authentication database 155 may include, for example, the username, group, and IP address. The authentication information that is received from network device 115 may include, for example, the IP address and MAC address. Identity controller 160 may match up the authentication information received from authentication database 155 with the authentication information received from network device 155, e.g. based on the IP address.

In stage 380, one or more policies regarding endpoint 105A is determined and sent to network device 115A, e.g. by a means for determining and sending policy/ies such as identity controller 160. The policy/ies may relate to handling data from endpoint 105A. After network device 115A receives the policy/ies, network device 115A may apply the policy/ies to data from endpoint 105A, so that data from endpoint 105A is classified to the right VLAN e.g. in method 400.

For example, identity controller 160 may determine group based policy/ies for endpoint 105A, based on the group(s) (e.g. security group(s)) of the respective user(s). Identity controller 160 may send identifier(s) of the group(s) and the group based policy/ies to network device 115A.

Determining policy/ies may include, for instance, formulating new policy/ies and/or retrieving existing policy/ies. Existing group based policy/ies may have been previously formulated, for example, for other endpoint(s) 115 having user(s) in the same group(s) as endpoint 105A.

Stage 360 to 380 may be performed if endpoint 105A requires authentication, after endpoint 105A is assigned an IP address in stage 350. If authentication is not being performed for endpoint 105A, then stages 360 to 380 may be omitted for endpoint 105A. Method 300 then ends.

Method 300 may be performed one or more times, for example each time any endpoint 105 is connected in network 100, for the first time or in a subsequent reconnection. Method 300 may be performed for a single endpoint 105 at a time, concurrently for two or more endpoints 105, etc. For example, at the initial setup of network 100, method 300 may need to be repeated a plurality of times, concurrently and/or sequentially for the various endpoints 105 that are being connected. If after the initial setup, one or more endpoints 105 are being connected during a certain time interval, method 300 may be performed during the time interval for the one the one or more endpoints 105.

Figure 4:
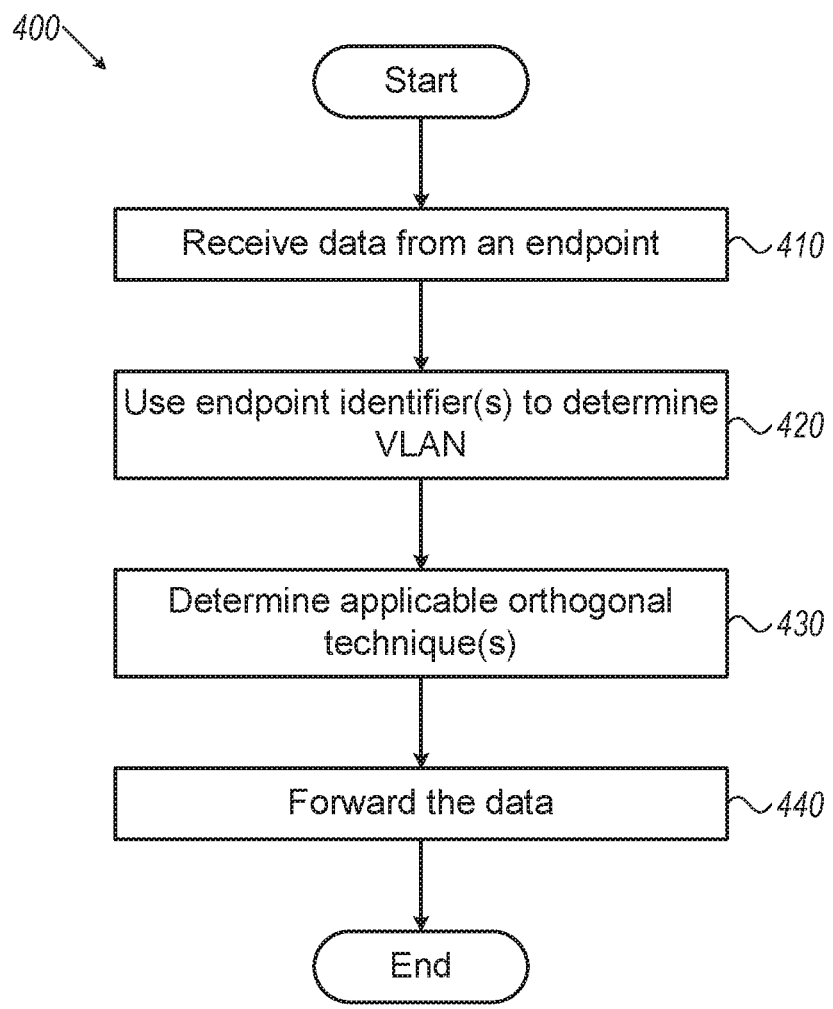
FIG. 4 is yet another flowchart of a method, in accordance with some embodiments of the presently disclosed subject matter.

FIG. 4 illustrates a method 400, in accordance with some embodiments of the presently disclosed subject matter.

Method 400 will be described with reference to network 100 of FIG. 1 but may be applied to any suitable network. Method 400 will be described, more specifically, with reference to access port 120A of network device 115A and to endpoint 105A, but may be applied to any access port 120 of any network device 115 and to any endpoint 105.

In stage 410, an access port 120A receives data from an endpoint 105 (the "source endpoint" for this data, assumed to be endpoint 105A). Source endpoint 105A is assumed to be connected to access port 120A. The data is indicative of one or more identifier(s) (e.g. any of the identifier(s) discussed above) of source endpoint 105A.

In various embodiments, if the received data is VLAN tagged, the data may be dropped, the VLAN tag may be ignored, or the VLAN tag may be used for forwarding the data. Typically although not necessarily, if the received data is VLAN tagged, the data is dropped. If the data is dropped or the VLAN tag is used to forward the data, then method 400 ends. In the embodiments now being described, it is assumed that the data is admitted at access port 120A by network device 115A, e.g. because the data is not VLAN tagged, or because the VLAN tag is ignored, and that the remaining stages of method 400 are performed. More specifically for instance, access port 120A may admit the data.

In stage 420, network device 115A uses the identifier(s) of source endpoint 105A to determine to which VLAN source endpoint 105A was assigned (e.g. in stage 320 or 330 of FIG. 3). For example, network device 115A may use the endpoint identifier(s) to retrieve an indication of the VLAN assignment for endpoint 105A, and thereby determine the assigned VLAN. Continuing with describing such an example, network device 115A may retrieve an indication of the VLAN assignment that was stored locally in network device 115A (e.g. more specifically in forwarding tables of network device 115A) and/or an indication of the VLAN assignment that was stored in tracking database 180. Network device 115A may then classify the data to the right VLAN, the right VLAN being the determined VLAN. Network device 115A optionally updates such indication(s) of VLAN assignment for additional identifier(s), if any, of endpoint 105A that are indicated by the data but not currently stored.

As another example, network device 115A may use the endpoint identifier(s) to determine the assigned VLAN without retrieving a previously stored indication of VLAN assignment. Continuing with describing such an example, network device 115A may use an IP address identifier of source endpoint 105A, indicated by the data, to determine the subnet to which the IP address belongs and consequently determine the VLAN as being the VLAN associated with the subnet. Network device 115A may then classify the data to the right VLAN, the right VLAN being the determined VLAN.

More specifically, for instance, forwarding logic of network device 115A may use the identifier(s) to determine the assigned VLAN when an indication of the VLAN assignment is not being retrieved from tracking database 180 in order to determine the assigned VLAN. A CPU of network device 115A, for instance, may use the identifier(s) to determine the assigned VLAN when an indication of VLAN assignment is retrieved from tracking database 180 in order to determine the assigned VLAN.

In stage 430, network device 115A optionally determines if any orthogonal technique(s) which prevent certain endpoints in the assigned VLAN from communicating with one another are to be applied to the data. Examples of orthogonal techniques may include: a split horizon group technique, a private VLAN technique, and/or a group-based policy technique. A split horizon group technique may be applied to prevent data from being sent back to the source endpoint. A private VLAN technique, as is known in the art, may be applied to restrict access port 120A. A group based policy technique may be applied to implement a policy with respect to a set of endpoints (e.g. associated with a group of users) from among the endpoints assigned to a particular VLAN. A group based policy, for example may have been received by the network device 115A in stage 380. Examples of group based polices may include quality of service (QoS), security, and/or access control, etc. for the data.

In some embodiments, stage 430 may be omitted, e.g. if orthogonal techniques are irrelevant to network 100.

In stage 440, the data is forwarded by network device 115A (e.g. more specifically by forwarding logic of network device 115A), at least partly based on the assigned VLAN that was determined in stage 420. Optionally the forwarding is also based on any orthogonal technique(s) that were determined to be applicable in stage 430. Forwarding may include operation(s) such as bridging and/or routing, etc. The forwarding may include, for example, forwarding the data to all access ports 120 on network device 115A that have at least one endpoint 105 connected that is assigned to the same VLAN, especially in the case of broadcast data and all access ports 120 being in the same VLAN. In another example, the forwarding may include forwarding the data to all ports (e.g. trunk ports) of network device 115A that connect to other network devices 115. In such an example, network device 115A may add a VLAN tag, that indicates the VLAN determined in stage 420, to the data that is being forwarded to the trunk ports of network device 115A. Optionally, one or more appropriate physical layer function(s) may be implemented by PHYs of network device 115A after the data is received at access port 120A and/or before the data exits from one or more port(s) of network device 115A. Method 400 then ends.

Network device 115A may repeat method 400 for any data received from any endpoint(s) 105 connected to any access port(s) 120 included in network device 115A. Similarly, any particular network device 115 in network 100 may perform method 400 for any data received from any endpoints 105 connected to any access port(s) 120 included in the particular network device 115.

Some embodiments of the presently disclosed subject matter may include one or more of the following advantages. First, the decision of which access port to connect an endpoint to may be less pressing, as the endpoint VLAN assignment is not required to conform to an access port VLAN assignment. Second, an access port may handle data that is not VLAN tagged (also referred to as native Ethernet data), e.g. not tagged in accordance with 802.1Q, while not being restricted to one VLAN. Therefore, endpoints in the network do not need to be capable of VLAN tagging and traditional VLAN/bridging semantics may be maintained (i.e. forwarding at layer 2 across access ports in the same VLAN may be maintained). It is noted that there may be endpoints that do not support trunking (or in other words do not support VLAN tagging) and therefore would not be able to be connected to a port that is in trunk mode rather than in access mode, and is expecting VLAN tagged data or data associated with the native VLAN of the trunk port.

Third, endpoints may be assigned to VLANs in a manner which complies with a uniform subnet assignment policy, regardless of the distribution of endpoints across access ports. The various network devices in the network may therefore act as a single large network device which handles the traffic of data in the network, presenting to the endpoints that connect to the various access ports of the network devices the same characteristics such as bridge-ID, bridge-priority, gateway MAC, and/or gateway IP, etc. Fourth, since the same VLANs may be used for a plurality of access ports, the network deployment and operation may be simplified. For example, configuration of a plurality of access ports may be performed concurrently. Fifth, in some cases the access ports may be part of a fabric, due to scale and simplicity requirements, whereas in other cases the access ports may be part of any other suitable network. Sixth, Active Directory may be employed for authentication of an endpoint even when there is a plurality of VLANs across the access port connected to the endpoint, because a VLAN is assigned to the endpoint, prior to performance of a DHCP for an IP address. Other advantages may be apparent from the description herein.

In some embodiments, any of the methods described above, such as method 200, 300 or 400 may include fewer, more and/or different stages than described with reference to FIG. 2, 3, or 4. Additionally or alternatively, stages may be performed in a different order than illustrated; and/or two or more stages that are illustrated as being performed sequentially may be performed concurrently. Additionally or alternatively, any stage of method 200, 300, or 400 may in addition to or instead of what is described herein include any other suitable procedure(s), such as other suitable procedure(s) known in the art. For example, stages 210 may include other procedure(s) known in the art for dividing a network into a plurality of VLANs, stage 220 may include any other procedure(s) known in the art for associating subnet(s) with VLAN(s), etc.

In some embodiments software that is mentioned herein may include firmware, when appropriate. Software may, for example, be included in one or more computer readable media. A particular computer readable medium, for example, may include any suitable medium for transferring software, e.g. if software is downloaded in electronic form over a network (e.g. from the Internet). Alternatively or additionally, a particular computer readable medium may, for example, include any computer storage medium suitable for storage of software, such as an optical storage medium, a magnetic storage medium, or an electronic storage medium. One or more computer storage media are also referred to herein as memory.

It will therefore be appreciated that the subject matter contemplates, for example, a computer program product comprising a computer readable medium having computer readable program code (also referred to as software) embodied therein for executing one or more methods disclosed herein; for executing one or more parts of method(s) disclosed herein, e.g. with reference to FIGS. 2, 3 and/or 4; and/or for implementing functionality of any of the elements described herein, e.g. with reference to FIG. 1. Further contemplated, for example, is computer readable program code for executing method(s) disclosed herein; for executing part(s) of method(s) disclosed herein; and/or for implementing functionality of any of the elements described herein. Further contemplated, for example, is a computer readable medium having computer readable program code embodied therein for executing method(s) disclosed herein; for executing part(s) of method(s) disclosed herein; and/or for implementing functionality of any of the elements described herein.

In the above description of example embodiments, numerous specific details are set forth in order to provide a thorough understanding of the subject matter. However, it will be appreciated by those skilled in the art that some examples of the subject matter may be practiced without these specific details. In other instances, well-known features have not been described in detail so as not to obscure the subject matter.

It will also be appreciated that various features of the subject matter which are, for clarity, described in the contexts of separate embodiments may also be provided in combination in a single embodiment. Conversely, various features of the subject matter which are, for brevity, described in the context of a single embodiment may also be provided separately or in any suitable subcombination.

It will further be appreciated by persons skilled in the art that the presently disclosed subject matter is not limited by what has been particularly shown and described hereinabove. Rather the scope of the subject matter is defined by the appended claims and equivalents thereof:

What is claimed is:

1. A network device comprising a memory, a processor, and a plurality of ports, the network device adapted to receive at least one configuring instruction, and adapted, after receipt of any of the at least one configuring instruction, to configure one or more access ports, of the plurality of ports, for endpoint virtual local area network (VLAN) assignment that is in accordance with at least one VLAN assignment algorithm based, at least in part, on available Internet Protocol (IP) addresses for each of a respective subnet of a plurality of subnets associated with each of a respective VLAN of a plurality of VLANs in a network, wherein the at least one VLAN assignment algorithm allows at least two endpoints to be assigned to at least two different respective VLANs of the plurality of VLANs in the network, the at least one VLAN assignment algorithm enabling the at least two endpoints to connect to a same access port of the one or more access ports and provide data which is not VLAN tagged when received at the same access port.

2. The network device of claim 1, wherein the at least one VLAN assignment algorithm includes at least one default algorithm.

3. The network device of claim 1, wherein the at least one VLAN assignment algorithm includes at least one of: an algorithm that is specified in any of the at least one configuring instruction, or an algorithm that is referred to in any of the at least one configuring instruction.

4. The network device of claim 1, wherein the at least one VLAN assignment algorithm includes at least one proportional assignment algorithm that is dependent on respective quantities of IP addresses or available IP addresses in respective subnets associated with the respective plurality of VLANs.

5. The network device of claim 4, wherein the at least one proportional assignment algorithm includes at least one of: a weighted function assignment or a weighted round robin assignment.

6. The network device of claim 1, wherein the at least one VLAN assignment algorithm includes at least one algorithm for assigning an endpoint that is connected to the network device or to another network device in the network, to any VLAN that is, for the network device or for the other network device to which the endpoint is connected, associated with a particular subnet.

7. The network device of claim 1, wherein the at least one VLAN assignment algorithm includes at least one algorithm for assigning the at least two endpoints based on respective one or more identifiers.

8. The network device of claim 1, wherein the at least one VLAN assignment algorithm includes at least one algorithm for assigning an endpoint that is being reconnected to the network, wherein the at least one algorithm for assigning the endpoint that is being reconnected to the network includes assigning the endpoint that is being reconnected to the network to a respective VLAN, of the plurality of VLANs, that is associated with a same subnet as associated with a previously assigned VLAN, the endpoint having previously been assigned to the previously assigned VLAN.

9. The network device of claim 1, wherein being adapted to configure the one or more access ports for endpoint VLAN assignment includes being adapted to configure the one or more access ports for endpoint VLAN assignment performed by the network device, the network device being further adapted to apply the at least one VLAN assignment algorithm to perform a plurality of VLAN assignments of a plurality of endpoints, connected to the one or more access ports, to respective VLANs of the plurality of VLANs, wherein the plurality of VLAN assignments include the at least two endpoints connected to the same access port being assigned to the at least two different respective VLANs.

10. The network device of claim 1, further adapted to hold, for at least one endpoint that is connected to any of the one or more access ports, an indication of an assignment of an endpoint to a respective VLAN of the plurality of VLANs.

11. A network device comprising a memory, a processor, and a plurality of ports, the network device adapted to admit, at one or more access ports included in the network device, data from endpoints that have been assigned to various virtual local area networks (VLANs) of a network based, at least in part on, available Internet Protocol (IP) addresses for each of a respective subnet of a plurality of subnets associated with each of a respective VLAN of a plurality of VLANs in a network and are connected to any of the one or more access ports, the data indicative of respective identifiers of the endpoints, the network device being further adapted to use the respective identifiers to determine the various VLANs to which the endpoints were assigned, and to forward the data at least partly based on the various VLANs that were determined.

12. The network device of claim 11, wherein the data is not VLAN tagged.

13. The network device of claim 11, wherein the network device is adapted to forward the data based also on at least one of: split horizon group, private VLAN, or a group based policy.

14. A method comprising:
applying at least one virtual local area network (VLAN) assignment algorithm to assign an endpoint, connected to an access port of a network device in a network, to a respective VLAN of a plurality of VLANs in the network based, at least in part, on available Internet Protocol (IP) addresses for each of a respective subnet of a plurality of subnets associated with each respective VLAN of the plurality of VLANs in the network,
wherein subsequent to the applying, at least two endpoints, including the assigned endpoint, that are connected to the access port and provide data that is not VLAN tagged when received by the access port, are characterized by having been assigned to at least two different respective VLANs of the plurality of VLANs, and wherein said at least two different respective VLANs, include the respective VLAN.

15. The method of claim 14, wherein the applying is performed by the network device, the method further comprising:
admitting, at the access port, admitted data from one of the at least two endpoints, the admitted data indicative of at least one identifier of the one endpoint;
using the at least one identifier to determine a VLAN to which the one endpoint was assigned, of the plurality of VLANs; and
forwarding the admitted data at least partly based on the VLAN that was determined.

16. The method of claim 14, wherein the applying is performed centrally and wherein the respective VLAN is associated with a respective subnet and the at least two different respective VLANs are associated with at least two respective subnets which include the respective subnet, the method further comprising: applying the at least one VLAN assignment algorithm, or at least one other VLAN assignment algorithm, to assign another endpoint connected to another access port of another network device in the network to the respective VLAN or to another VLAN associated with the respective subnet, wherein subsequent to the applying to assign another endpoint, at least two other endpoints, including the other assigned endpoint, that are connected to the other access port and provide data that is not VLAN tagged when received by the other access port, are characterized by having been assigned to the at least two different respective VLANs or to at least two different respective VLANs associated with the at least two respective subnets.

17. A system comprising:
means for dividing a network into a plurality of virtual local area networks (VLANs); and
means for providing, to a plurality of network devices in the network, a plurality of configuring instructions for configuring a plurality of access ports of the plurality of network devices for endpoint VLAN assignment that is in accordance with at least one VLAN assignment algorithm that provides endpoint VLAN assignment based, at least in part, on available Internet Protocol (IP) addresses for each of a respective subnet of a plurality of subnets associated with each of a respective VLAN of the plurality of VLANs, wherein the at least one VLAN assignment algorithm allows at least two endpoints to be assigned to at least two different respective VLANs of the plurality of VLANs, the at least one VLAN assignment algorithm enabling the at least two endpoints to connect to a same access port of the plurality of access ports and provide data which is not VLAN tagged when received at the same access port.

18. The system of claim 17, further comprising:
means for assigning the available IP addresses to a plurality of endpoints in the network from respective subnets associated with respective VLANs that were assigned to the plurality of endpoints, wherein the plurality of endpoints includes the at least two endpoints and the respective VLANs include the at least two different respective VLANs;
means for receiving authentication information regarding the plurality of endpoints or respective users associated with the plurality of endpoints; and
means for determining and sending respective policies regarding respective endpoints, of the plurality of endpoints, to respective network devices, of the plurality of network devices, which include respective access ports, of the plurality of access ports, to which the respective endpoints are connected.

19. The system of claim 17, further comprising: means for implementing a tracking database, wherein the tracking database includes data relating to operation of the network.

20. The system of claim 17, further comprising: means for receiving input from a network administrator.

* * * * *